United States Patent
Ando et al.

(10) Patent No.: US 11,866,045 B2
(45) Date of Patent: Jan. 9, 2024

(54) AUTOMATIC TEST OBJECT DRIVING DEVICE, AUTOMATIC TEST OBJECT DRIVING METHOD, AND TEST OBJECT TESTING SYSTEM

(71) Applicant: HORIBA, LTD., Kyoto (JP)

(72) Inventors: Yoshitake Ando, Kyoto (JP); Takashi Saito, Kyoto (JP)

(73) Assignee: Horiba, Ltd.

( * ) Notice: Subject to any disclaimer, the term of this patent is extended or adjusted under 35 U.S.C. 154(b) by 0 days.

(21) Appl. No.: 17/918,056

(22) PCT Filed: Feb. 24, 2021

(86) PCT No.: PCT/JP2021/006761
§ 371 (c)(1),
(2) Date: Oct. 10, 2022

(87) PCT Pub. No.: WO2021/205767
PCT Pub. Date: Oct. 14, 2021

(65) Prior Publication Data
US 2023/0150504 A1    May 18, 2023

(30) Foreign Application Priority Data

Apr. 10, 2020    (JP) ................................ 2020-071005

(51) Int. Cl.
*B60W 30/18*    (2012.01)
*G01C 21/00*    (2006.01)

(52) U.S. Cl.
CPC ... *B60W 30/18109* (2013.01); *G01C 21/3859* (2020.08); *B60W 2510/104* (2013.01); *B60W 2510/182* (2013.01)

(58) Field of Classification Search
CPC ..... B60W 30/18109; B60W 2510/104; B60W 2510/182; G01C 21/3859; G01M 17/0074
See application file for complete search history.

(56) References Cited

U.S. PATENT DOCUMENTS 4,442,708 A    4/1984  Gable et al.
6,029,107 A *  2/2000  Sato ........................ F16H 59/66
                                                  477/901

FOREIGN PATENT DOCUMENTS

JP          08035913 A    2/1996
JP     2000338004 A   12/2000
(Continued)

OTHER PUBLICATIONS

International Search Report for Application No. PCT/JP2021/006761, dated Apr. 20, 2021 27 Pages.

*Primary Examiner* — Tyler J Lee
*Assistant Examiner* — Yufeng Zhang
(74) *Attorney, Agent, or Firm* — Brooks Kushman P.C.

(57) ABSTRACT

The present invention is intended to make it possible to automatically drive a test object without performing pre-learning for a running performance map for each vehicle. There is provided an automatic test object driving device that automatically drives a test vehicle based on a command vehicle speed, and that includes a driving actuator for performing driving operation of the test vehicle, and a driving control unit for controlling the driving actuator. The driving control unit includes a first accelerator map and a second accelerator map each of which indicates a relationship among a vehicle-speed-related value, an acceleration-related value, and an accelerator-depression-amount-related value. The driving control unit uses the first accelerator map to determine an accelerator depression amount corresponding to the command vehicle speed, and uses the second accelerator map to correct the accelerator depression amount by feeding back a vehicle speed and an acceleration of the test vehicle.

10 Claims, 8 Drawing Sheets

(56) References Cited

FOREIGN PATENT DOCUMENTS

| | | | |
|---|---|---|---|
| JP | 2005297872 | A | 10/2005 |
| JP | 2013134151 | A | 7/2013 |
| JP | 2015129701 | A | 7/2015 |

* cited by examiner

AUTOMATIC TEST OBJECT DRIVING DEVICE, AUTOMATIC TEST OBJECT DRIVING METHOD, AND TEST OBJECT TESTING SYSTEM

CROSS-REFERENCE TO RELATED APPLICATIONS

This application is the U.S. national phase of PCT Application No. PCT/JP2021/006761, filed Feb. 24, 2021, which claims priority to Japanese Patent Application No. 2020-071005, filed Apr. 10, 2020, which are both incorporated by reference herein in their entireties.

TECHNICAL FIELD

The present invention relates to an automatic test object driving device and an automatic test object driving method for automatically driving a test object that is a test vehicle or a part of the test vehicle on the basis of a command vehicle speed, and a test object testing system in which the automatic test object driving device is used.

BACKGROUND ART

Conventionally, for example, when a vehicle is automatically driven on a chassis dynamometer, the vehicle is caused to run in a predetermined running pattern by using an automatic driving robot for operating an accelerator, a brake, and the like of the vehicle, and a test of the vehicle is performed.

The automatic driving robot receives input of a command vehicle speed on the basis of a running pattern defined by a legal regulation or a user. Examples of legal regulations in respective countries include JC08 (Japan), NEDC (Europe), WLTP (mainly in Japan, Europe, etc.), FTP75 (the United States (US)), US06 (US), HWFET (US), and SC03 (US).

The automatic driving robot needs to drive various vehicles according to predetermined running patterns. Thus, the automatic driving robot uses a running performance map indicating a relationship among a vehicle speed, an acceleration, and a throttle opening degree obtained for each test vehicle to calculate a throttle opening degree command value. On the basis of this command value, the automatic driving robot operates an accelerator or a brake to cause an actual vehicle speed of a vehicle to follow a command vehicle speed.

The running performance map, however, needs to be obtained for each test vehicle. Thus, pre-learning is performed for obtaining the running performance map before the running test is performed. The pre-learning requires about 20 to 40 minutes per one time, and thus this hinders improvement in test efficiency.

CITATION LIST

Patent Literature

Patent Literature 1: JP 08-035913 A

SUMMARY OF INVENTION

Technical Problem

The present invention has been made in view of the above problem, and it is a main object of the present invention to make it possible to automatically drive a test object without performing pre-learning for a running performance map for each vehicle.

Solutions to Problem

That is, an automatic test object driving device according to the present invention is an automatic test object driving device configured to automatically drive a test object that is a test vehicle or a part of the test vehicle based on a command vehicle speed, and includes a driving control unit configured to control the test object based on the command vehicle speed. The driving control unit includes a first accelerator map and a second accelerator map each of which indicates a relationship among a vehicle-speed-related value, an acceleration-related value, and an accelerator-depression-amount-related value. The driving control unit is configured to use the first accelerator map to determine an accelerator-depression-amount-related value corresponding to the command vehicle speed, and to use the second accelerator map to correct the accelerator-depression-amount-related value by feeding back a vehicle-speed-related value or an acceleration-related value of the test object.

With such a configuration, in the first accelerator map and the second accelerator map each of which indicates the relationship among the vehicle-speed-related value, the acceleration-related value, and the accelerator-depression-amount-related value, the first accelerator map is used to determine the accelerator-depression-amount-related value corresponding to the command vehicle speed, and the second accelerator map is used to correct the accelerator depression amount by feeding back the vehicle-speed-related value or the acceleration-related value of the test object. Therefore, it is possible to automatically drive the test object without performing pre-learning for a running performance map for each vehicle. As a result, it is possible to efficiently perform a running test of the test object.

Here, the vehicle-speed-related value may be a value indicating a vehicle speed in addition to the vehicle speed itself. The acceleration-related value may be a value indicating an acceleration in addition to the acceleration itself. The accelerator-depression-amount-related value may be a value indicating an accelerator depression amount in addition to the accelerator depression amount itself.

Specifically, the driving control unit is preferably configured to determine the accelerator-depression-amount-related value corresponding to the command vehicle speed through feedforward control in which the first accelerator map is used, and to correct the accelerator-depression-amount-related value corresponding to the command vehicle speed through feedback control in which the second accelerator map is used.

Here, the first accelerator map is preferably a standard map that is common to vehicle models, and the second accelerator map is preferably a standard map that is common to vehicle models in an initial state. It is conceivable that the standard map is, for example, a map created by averaging existing pieces of accelerator map data of a plurality of vehicle models, or a map restored by performing principal component analysis on existing pieces of accelerator map data of a plurality of vehicle models.

To correct response characteristics of the test object and thus improve performance of following the command vehicle speed, the driving control unit preferably includes a map update section that is configured to update the second accelerator map based on the command vehicle speed, the corrected accelerator-depression-amount-related value, and the vehicle-speed-related value or the acceleration-related value of the test object.

To allow adjustment of a driving mode (roughness or smoothness of driving) of the test object, the driving control unit preferably includes a feedforward control section that is configured to perform differentiation of a command vehicle speed after a predetermined look-ahead time, and that is configured to input an acceleration-related value obtained by the differentiation to the first accelerator map.

To correct the response characteristics of the test object and thus perform a running test with high accuracy, the feedforward control section is preferably configured to change the look-ahead time based on the command vehicle speed, the corrected accelerator-depression-amount-related value, and the vehicle-speed-related value or the acceleration-related value of the test object.

The driving control unit preferably includes a first brake map and a second brake map each of which indicates a relationship between a deceleration-related value and a brake-depression-amount-related value. The driving control unit is preferably configured to use the first brake map to determine a brake-depression-amount-related value corresponding to the command vehicle speed, and to use the second brake map to correct the brake-depression-amount-related value by feeding back the vehicle-speed-related value or the acceleration-related value of the test object. Here, the deceleration-related value may be a value indicating a deceleration in addition to the deceleration itself. The brake-depression-amount-related value may be a value indicating a brake depression amount in addition to the brake depression amount itself.

A test object testing system according to the present invention preferably further includes a driving actuator that is configured to perform driving operation of the test object. The driving control unit is preferably configured to control the test object by controlling the driving actuator.

The test object testing system according to the present invention includes a chassis dynamometer that is configured to perform a running test of a test object that is a test vehicle or a part of the test vehicle, and the above-described automatic test object driving device.

An automatic test object driving method according to the present invention is an automatic test object driving method of automatically driving a test object that is a test vehicle or a part of the test vehicle based on a command vehicle speed. The method includes using a first accelerator map and a second accelerator map each of which indicates a relationship among a vehicle-speed-related value, an acceleration-related value, and an accelerator-depression-related-value amount. The using includes using the first accelerator map to determine an accelerator-depression-amount-related value corresponding to the command vehicle speed, and using the second accelerator map to correct the accelerator-depression-related-value amount by feeding back a vehicle-speed-related value and an acceleration-related value of the test object. The method further includes controlling a driving actuator that is configured to perform driving operation of the test object, based on the corrected accelerator-depression-amount-related value.

Advantageous Effects of Invention

According to the present invention described above, it is possible to automatically drive a test object without performing pre-learning for a running performance map for each vehicle.

REFERENCE SIGNS LIST

Figure 1:
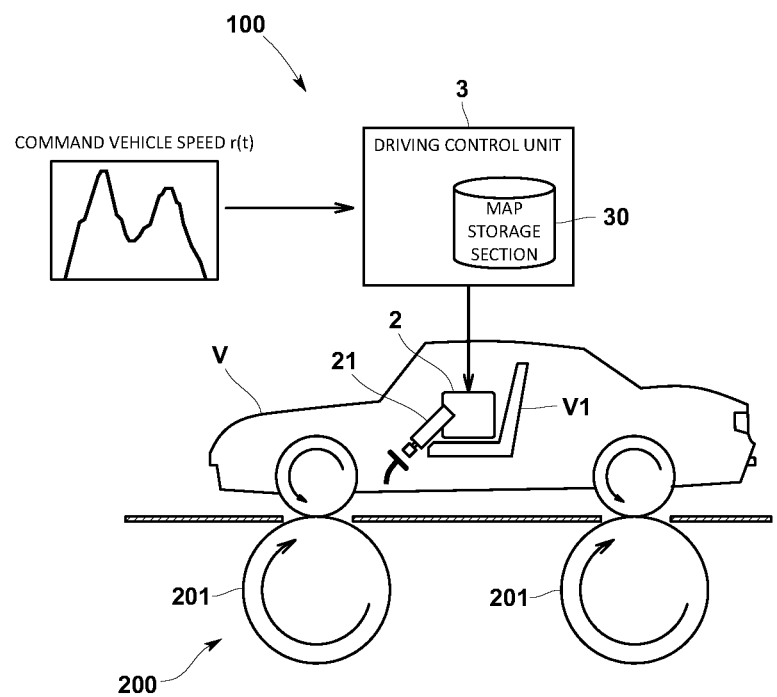
FIG. 1 is an overall schematic diagram of an automatic test object driving device according to an embodiment of the present invention.

100 automatic driving device
200 chassis dynamometer
V test vehicle (test object)
2 driving operation unit
21 driving actuator
10A first map
10B second map
3 driving control unit
31 feedforward control section
32 feedback control section
33 adder
34 map update section

DESCRIPTION OF EMBODIMENTS

Hereinafter, an automatic test object driving device according to an embodiment of the present invention will be described with reference to the drawings.

As illustrated in FIG. 1, the automatic test object driving device 100 according to the present embodiment includes a driving operation unit 2 and a driving control unit 3. The driving operation unit 2 is provided for automatically driving a test vehicle V, which is a test object placed on rotation rollers 201 of a chassis dynamometer 200. The driving control unit 3 controls the driving operation unit 2. The automatic test object driving device 100 is, together with the chassis dynamometer 200, included in a test object testing system.

The driving operation unit 2 is placed on a seat surface of a driver's seat V1 in the test vehicle V, and includes driving actuators 21 each of which operates a corresponding one of an accelerator pedal, a brake pedal, a shift lever, or an ignition switch, or the like of the test vehicle V.

Specifically, the driving operation unit 2 includes an accelerator actuator that performs depression operation of the accelerator pedal, a brake actuator that performs depression operation of the brake pedal, a shift lever actuator that operates the shift lever, or a switch actuator that operates the ignition switch, each of which serves as the driving actuator 21. Besides, the driving operation unit 2 may, as necessary, include a clutch actuator that performs depression operation of a clutch pedal, or the like.

The driving control unit 3 controls each actuator 21 of the driving operation unit 2 using an input command vehicle speed as a target value to cause an actual vehicle speed of the test vehicle V to follow the command vehicle speed. The command vehicle speed r(t) is, for example, a vehicle speed that is determined by a running pattern defined by each legal regulation such as JC08 (Japan), NEDC (Europe), WLTP (mainly in Japan, Europe, etc.), FTP75 (US), US06 (US), HWFET (US), or SC03 (US), or a vehicle speed that is determined by a running pattern defined by a user.

Figure 2:
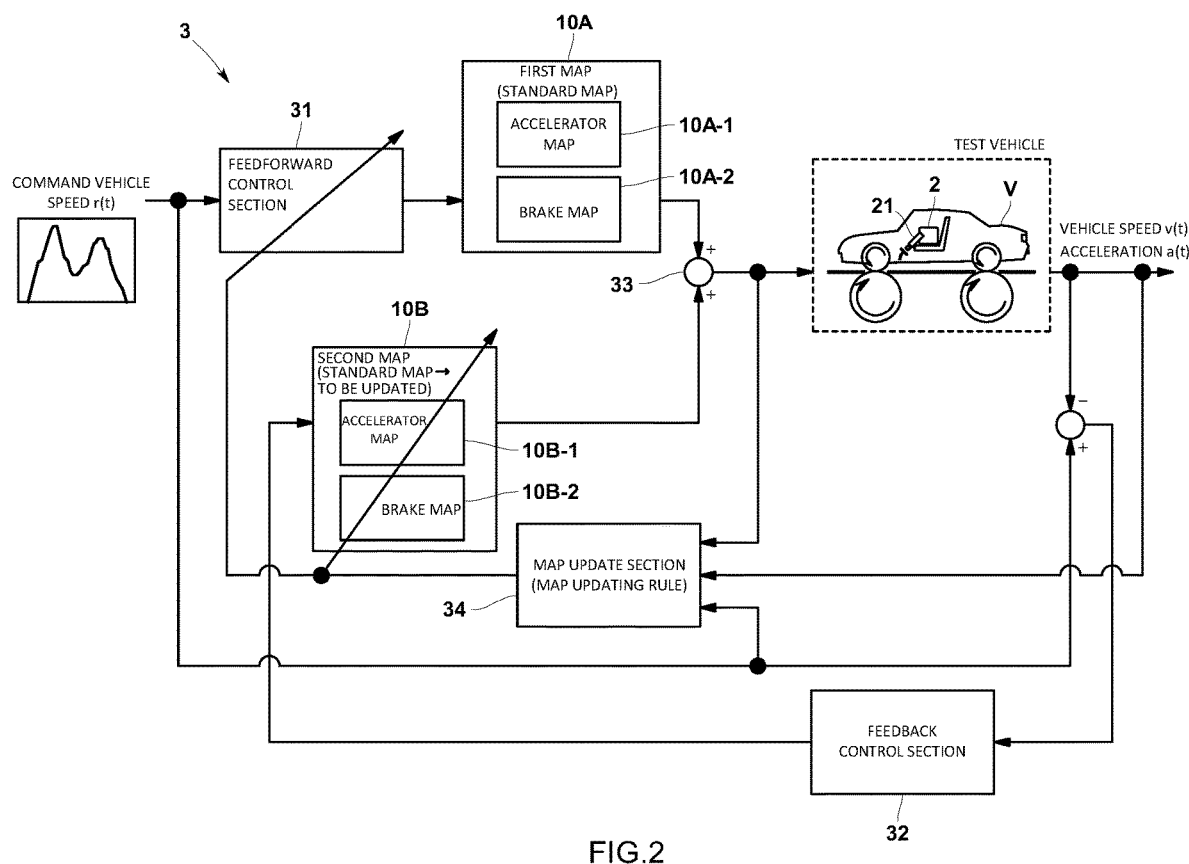
FIG. 2 is a functional block diagram of a driving control unit according to the embodiment.

Specifically, as illustrated in FIG. 2, the driving control unit 3 controls each actuator 21 (particularly, the accelerator actuator or the brake actuator) of the driving operation unit 2 by using two running performance maps 10A and 10B. The driving control unit 3 is a computer including a central processing unit (CPU), an internal memory, an input/output interface, an analog-to-digital (AD) converter, and the like. The driving control unit 3 controls each actuator 21 on the basis of a driving control program stored in the internal memory.

Figure 3:
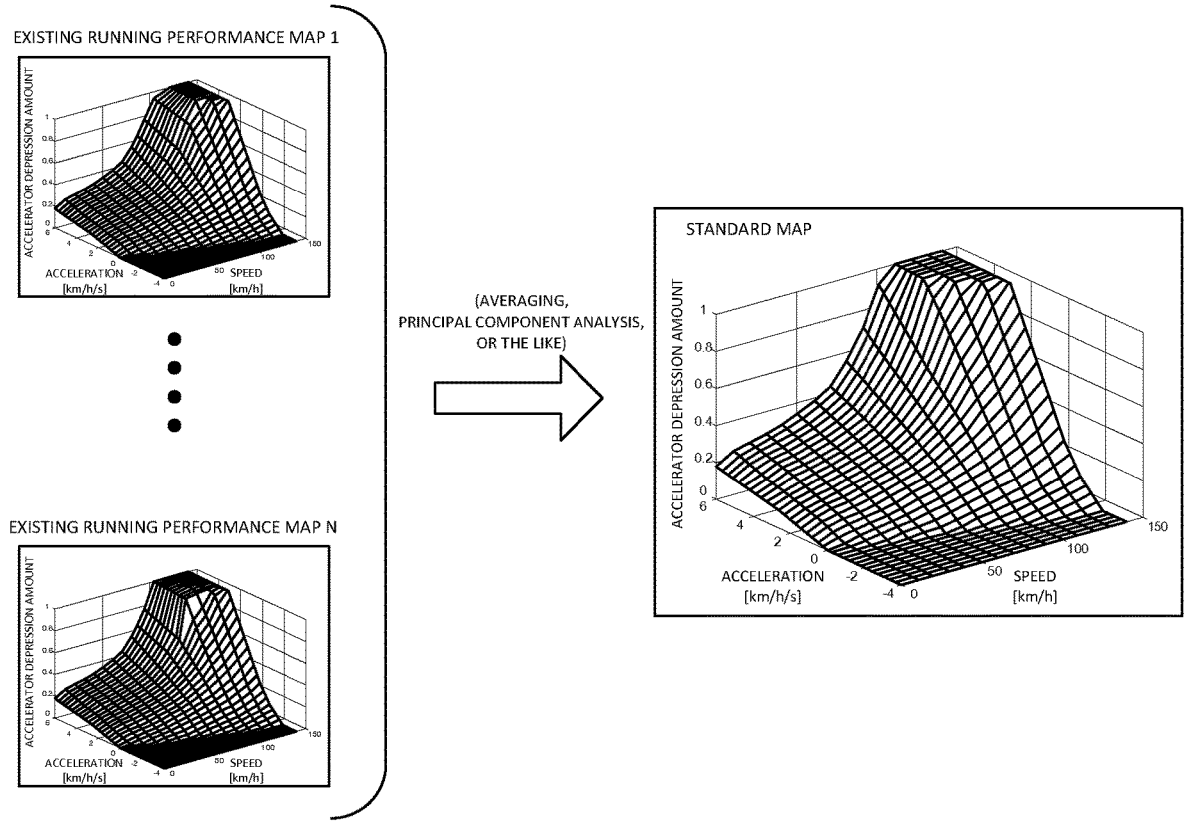
FIG. 3 is a schematic diagram illustrating a method of creating a standard map in an accelerator map.
Figure 4:
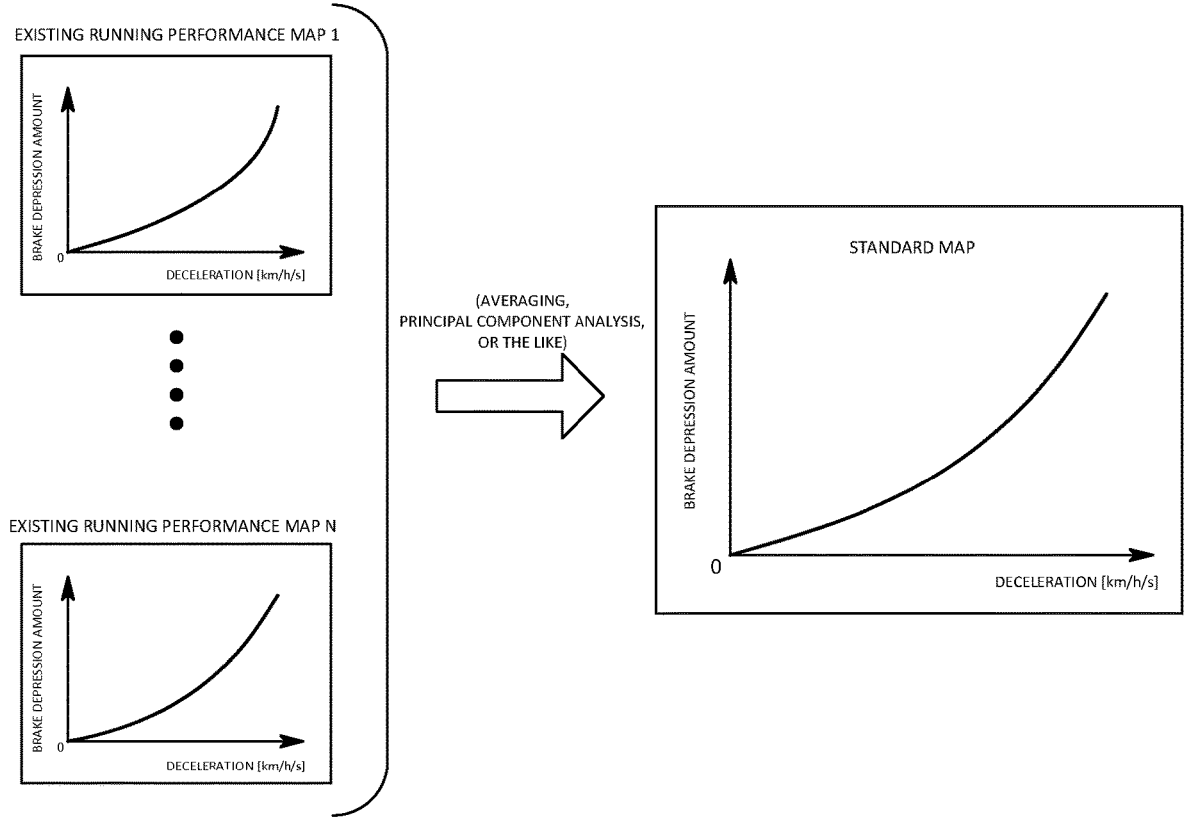
FIG. 4 is a schematic diagram illustrating a method of creating a standard map in a brake map.

The two running performance maps 10A and 10B include accelerator maps 10A-1 and 10B-1, respectively, and include brake maps 10A-2 and 10B-2, respectively. As illustrated in FIG. 3, each of the accelerator maps 10A-1 and 10B-1 is a three-dimensional standard map that is common to vehicle models, and is data with which an accelerator depression amount can be obtained from a speed and an acceleration. As illustrated in FIG. 4, each of the brake maps 10A-2 and 10B-2 is a two-dimensional standard map that is common to vehicle models, and is data with which a brake depression amount can be obtained from a deceleration.

Hereinafter, when the two running performance maps 10A and 10B are distinguished, the one of them is referred to as a "first map 10A" or the like, and the other is referred to as a "second map 10B" or the like. The two running performance maps 10A and 10B are stored in a map storage section 30 provided in the driving control unit 3.

Figure 5:
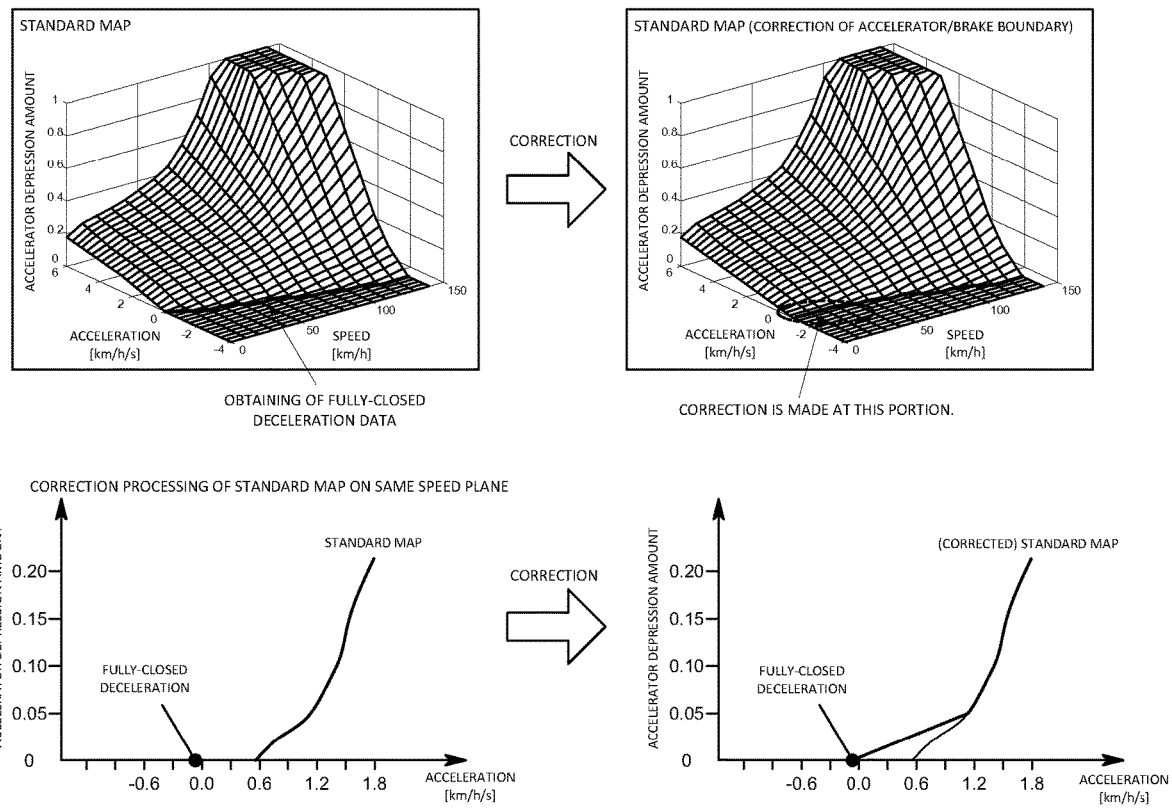
FIG. 5 is a schematic diagram illustrating a method of correcting a standard map in an accelerator map.

As illustrated in FIGS. 3 and 4, it is conceivable that each of the running performance maps 10A and 10B is, for example, a map created by averaging existing running performance maps of a plurality of vehicle models, or a map restored by performing principal component analysis on existing running performance maps of a plurality of vehicle models. In the case where creation is made through the restoration by performing the principal component analysis, the principal component analysis is performed on the existing pieces of map data of the plurality of vehicle models, and then, for example, scores up to the seventh principal component are averaged to achieve the restoration. As illustrated in FIG. 5, as necessary, fully-closed deceleration data of the test vehicle V may be obtained, then a standard map may be corrected using the fully-closed deceleration data, and this corrected standard map may be used.

Here, each of the existing running performance maps is, for example, a map that has been created in the past.

A past accelerator map is created by the following procedures (1) to (3). (1) Learning running of a test vehicle is performed to obtain respective speeds and respective accelerations at various different accelerator depression amounts. (2) Then, data in which the accelerator depression amounts, the respective speeds, and the respective accelerations are related to one another is obtained. (3) Subsequently, on the basis of the data in which the accelerator depression amounts, the respective speed, and the respective accelerations are related to one another, plotting is performed on data (an accelerator map) with which an accelerator depression amount can be obtained from a speed and an acceleration.

A past brake map is created by the following procedures (1) to (3). (1) Learning running of a test vehicle is performed to obtain respective decelerations at various different brake depression amounts. (2) Then, data in which the brake depression amounts and the respective decelerations are related to each other is obtained. (3) Subsequently, on the basis of the data in which the brake depression amounts and the respective decelerations are related to each other, plotting is performed on data (a brake map) with which a brake depression amount can be obtained from a deceleration.

Then, the driving control unit 3 controls the driving actuator 21 such as the accelerator actuator or the brake actuator of the driving operation unit 2 by using a control algorithm of a two-degree-of-freedom control system. Here, the accelerator control and the brake control performed by the driving control unit 3 are switched such that the accelerator control is turned off and the brake control is turned on when a value in the accelerator map (the standard map) after correction becomes zero.

Specifically, the driving control unit 3 includes a feedforward control section 31 and a feedback control section 32. The feedforward control section 31 uses the first map 10A to determine an accelerator depression amount $Acc_{FF}(t)$ corresponding to the command vehicle speed r(t) or a brake depression amount $Brk_{FF}(t)$ corresponding to the command vehicle speed r(t). The feedback control section 32 uses the second map 10B to correct the accelerator depression amount $Acc_{FF}(t)$ or the brake depression amount $Brk_{FF}(t)$ by feeding back an actual vehicle speed and an actual acceleration of the test vehicle V.

The feedforward control section 31 differentiates a future command vehicle speed r(t) after a certain period of time (a predetermined look-ahead time) from the present time, and inputs a differential value (an acceleration) obtained by the differentiation to the first map 10A to obtain the accelerator depression amount $Acc_{FF}(t)$ or the brake depression amount $Brk_{FF}(t)$ of the feedforward control system.

The feedback control section 32 inputs a deviation between the command vehicle speed r(t) and the actual vehicle speed v(t) at the present time to a controller (for example, proportional-integral-derivative (PID) control). Then, the feedback control section 32 inputs an output value of the controller to the second map 10B to obtain an accelerator depression amount $Acc_{FB}(t)$ or a brake depression amount $Brk_{FB}(t)$ of the feedback control system.

The driving control unit 3 adds the accelerator depression amount $Acc_{FF}(t)$ of the feedforward control system and the accelerator depression amount $Acc_{FB}(t)$ of the feedback control system at an adder 33, and thus corrects (complements) the accelerator depression amount $Acc_{FF}(t)$ of the feedforward control system by using the accelerator depression amount $Acc_{FB}(t)$ of the feedback control system. Then, the driving control unit 3 controls the accelerator actuator using an accelerator depression amount command value indicating the corrected accelerator depression amount (Acc(t)=$Acc_{FF}(t)$+$Acc_{FB}(t)$). The driving control unit 3 also adds the brake depression amount $Brk_{FF}(t)$ of the feedforward control system and the brake depression amount $Brk_{FB}(t)$ of the feedback control system at the adder 33, and thus corrects (complements) the brake depression amount $Brk_{FF}(t)$ of the feedforward control system by using the brake depression amount $Brk_{FB}(t)$ of the feedback control system. Then, the driving control unit 3 controls the brake actuator using a brake depression amount command value indicating the corrected brake depression amount (Brk(t)=$Brk_{FF}(t)$+$Brk_{FB}(t)$).

Here, the driving control unit 3 includes a map update section 34 that updates the second accelerator map 10B-1 in the second map 10B on the basis of the command vehicle speed r(t), the corrected accelerator depression amount Acc (t), and the actual vehicle speed v(t) and the actual acceleration a(t) of the test vehicle V. The map update section 34 updates the second accelerator map 10B-1 in the second map 10B using a predetermined map updating rule. The second brake map 10B-2 in the second map 10B is similarly updated by the map update section 34.

Figure 6:
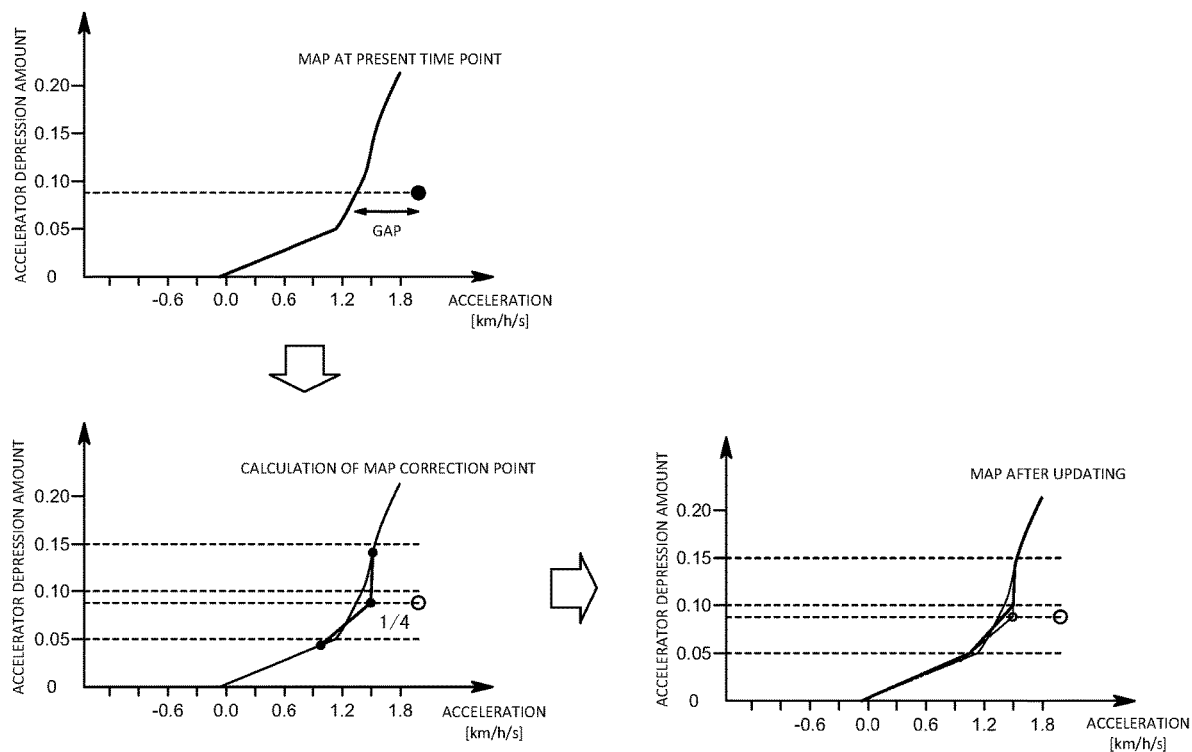
FIG. 6 is a schematic diagram illustrating a method of updating a standard map in an accelerator map.

FIG. 6 illustrates a specific example of map updating. In the second map 10B at the present time point, when a gap exists between an actual acceleration (here, 1.8 [km/h/s]) of the test vehicle V and a command acceleration (here, 1.4 [km/h/s]) on the second map 10B, at a throttle depression amount (here, 0.08), a map correction point is calculated first. For example, a point (here, a quarter-way point (1.5 [km/h/s])) between the actual acceleration and the command acceleration is set as the map correction point. Then, on the basis of the map correction point, the second accelerator map 10B-1 in the second map 10B is updated, for example, by using an approximation method such as a least-square method.

The feedforward control section 31 changes the look-ahead time on the basis of the command vehicle speed r(t), the corrected accelerator depression amount Acc(t), and the actual vehicle speed v(t) and the actual acceleration a(t) of the test vehicle V. Specifically, the feedforward control section 31 changes the look-ahead time in accordance with the type of transmission of the test vehicle V. In a case where the length or the like of a response time of the test vehicle V can be estimated during the test, the look-ahead time is changed on an as-needed basis.

Effects of Present Embodiment

According to the automatic test object driving device 100 in accordance with the present embodiment configured as described above, in the first map 10A (the first accelerator map 10A-1) and the second map 10B (the second accelerator map 10B-1) each of which indicates the relationship among the vehicle speed, the acceleration, and the accelerator depression amount, the first accelerator map 10A-1 is used to determine the accelerator depression amount corresponding to the command vehicle speed, and the second accelerator map 10B-1 is used to correct the accelerator depression amount by feeding back the vehicle speed and the acceleration of the test vehicle V. Therefore, it is possible to automatically drive the test vehicle V without performing pre-learning for a running performance map for each test vehicle V. As a result, it is possible to efficiently perform a running test of the test vehicle V on the chassis dynamometer 200.

Other Embodiments

Figure 7:
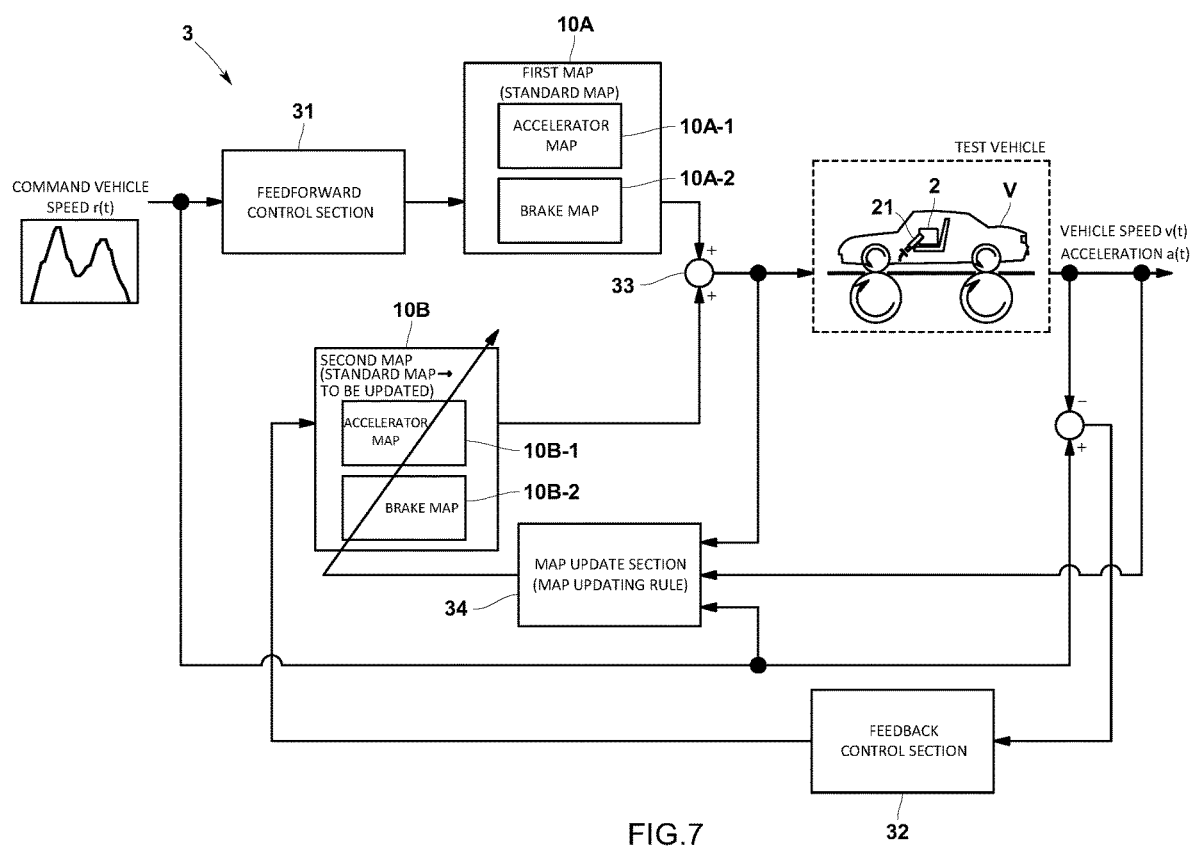
FIG. 7 is a functional block diagram of a driving control unit according to a modified embodiment.

For example, in the above embodiment, the feedforward control section 31 changes the look-ahead time on the basis of the command vehicle speed r(t), the corrected accelerator depression amount Acc(t), and the actual vehicle speed v(t) and the actual acceleration a(t) of the test vehicle V. However, as illustrated in FIG. 7, the feedforward control section 31 may not change the look-ahead time.

In the above embodiment, the second map 10B is updated by the map update section 34. However, the first map 10A may be updated on the basis of the command vehicle speed r(t), the corrected accelerator depression amount Acc(t), and the actual vehicle speed v(t) and the actual acceleration a(t) of the test vehicle V.

Figure 8:
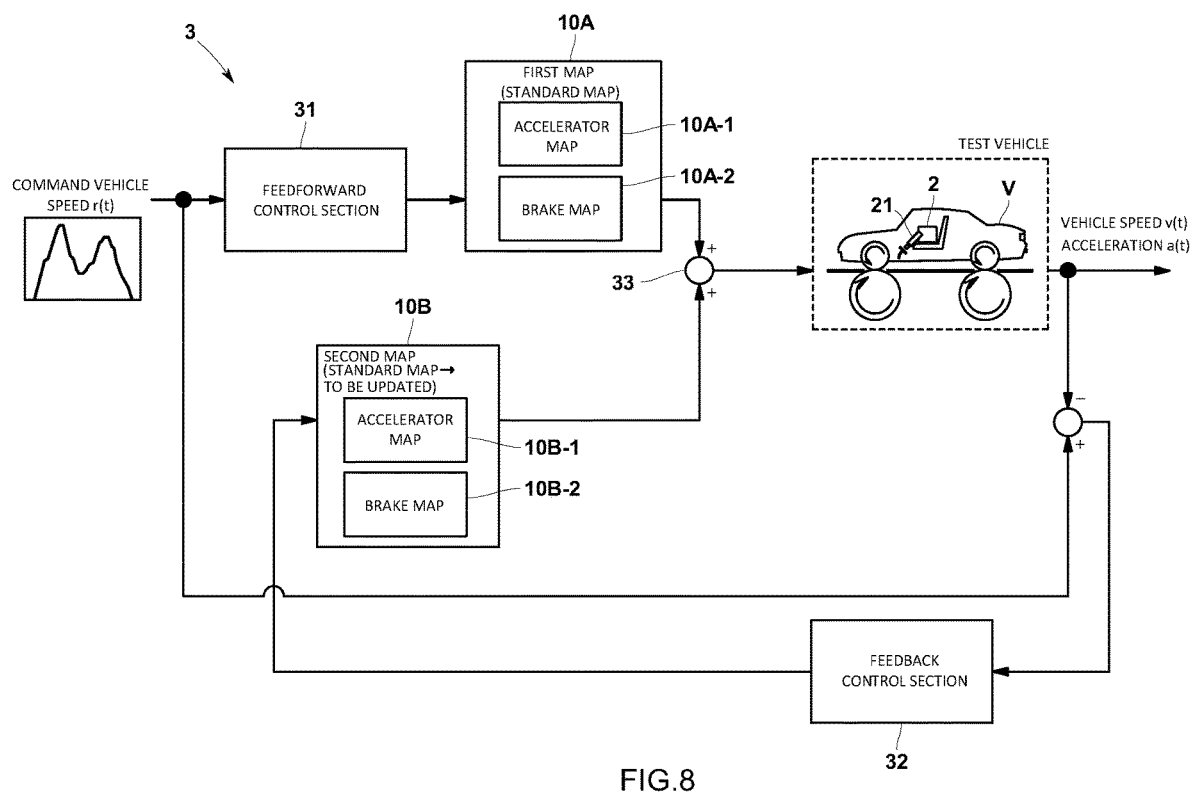
FIG. 8 is a functional block diagram of a driving control unit according to another modified embodiment.

The configuration in the above embodiment includes the map update section 34. However, as illustrated in FIG. 8, the configuration may not include the map update section 34. That is, the configuration may be formed such that the first map 10A and the second map 10B are not updated.

The first map 10A and the second map 10B in the above embodiment are the same before updating (in the initial state). However, the first map 10A and the second map 10B may be different from each other before updating.

The configuration in the above embodiment is provided with both the accelerator map and the brake map as the running performance maps. However, the configuration may be provided with either one (for example, only the accelerator map or only the brake map).

The feedforward control section 31 may differentiate a future command vehicle speed r(t) after a certain period of time (a predetermined look-ahead time) from the present time, and may input, to the first map 10A, a value calculated by multiplying a differential value (an acceleration) obtained by the differentiation by a predetermined gain value.

In the above embodiment, a completed vehicle is tested. However, for example, an engine may be tested by using an engine dynamometer. Alternatively, for example, a powertrain may be tested by using a dynamometer. The vehicle may be a hybrid vehicle, an electric vehicle, or a fuel cell vehicle.

The driving control unit according to the above embodiment controls the driving actuator. However, the driving control unit may control a test object by inputting a control signal to the test object, while the driving control unit does not control the driving actuator. In this case, for example, the driving control unit does not input, to the test object, a command value for an accelerator depression amount itself. Instead, the driving control unit inputs, to the test object, an accelerator-depression-amount-related value related to the accelerator depression amount.

Further, various modifications and combinations of the embodiments may be made without departing from the gist of the present invention.

INDUSTRIAL APPLICABILITY

According to the present invention, it is possible to automatically drive a test object without performing pre-learning for a running performance map for each vehicle.

The invention claimed is:

1. An automatic test object driving device configured to automatically drive a test object that is a test vehicle or a part of the test vehicle based on a command vehicle speed, the device comprising:
   a driving control unit configured to control the test object based on the command vehicle speed,
   wherein the driving control unit includes a first accelerator map and a second accelerator map each of which indicates a relationship among a vehicle-speed-related value, an acceleration-related value, and an accelerator-depression-amount-related value, and the driving control unit is configured to:
   use the first accelerator map to determine an accelerator-depression-amount-related value corresponding to the command vehicle speed; and
   use the second accelerator map to correct the accelerator-depression-amount-related value by feeding back a vehicle-speed-related value or an acceleration-related value of the test object.

2. The automatic test object driving device according to claim 1, wherein the driving control unit is configured to:

determine the accelerator-depression-amount-related value corresponding to the command vehicle speed through feedforward control in which the first accelerator map is used; and correct the accelerator-depression-amount-related value corresponding to the command vehicle speed through feedback control in which the second accelerator map is used.

3. The automatic test object driving device according to claim 1, wherein the first accelerator map is a standard map that is common to vehicle models, and the second accelerator map is a standard map that is common to vehicle models in an initial state.

4. The automatic test object driving device according to claim 1, wherein the driving control unit includes a map update section configured to update the second accelerator map based on the command vehicle speed, the corrected accelerator-depression-amount-related value, and the vehicle-speed-related value or the acceleration-related value of the test object.

5. The automatic test object driving device according to claim 1, wherein the driving control unit includes a feedforward control section configured to perform differentiation of a command vehicle speed after a predetermined look-ahead time, and input an acceleration-related value obtained by the differentiation to the first accelerator map.

6. The automatic test object driving device according to claim 5, wherein the feedforward control section is configured to change the look-ahead time based on the command vehicle speed, the corrected accelerator-depression-amount-related value, and the vehicle-speed-related value or the acceleration-related value of the test object.

7. The automatic test object driving device according to claim 1, wherein the driving control unit includes a first brake map and a second brake map each of which indicates a relationship between a deceleration-related value and a brake-depression-amount-related value, and the driving control unit is configured to:

use the first brake map to determine a brake-depression-amount-related value corresponding to the command vehicle speed; and use the second brake map to correct the brake-depression-amount-related value by feeding back the vehicle-speed-related value or the acceleration-related value of the test object.

8. The automatic test object driving device according to claim 1, further comprising:

a driving actuator configured to perform driving operation of the test object, wherein the driving control unit is configured to control the test object by controlling the driving actuator.

9. A test object testing system comprising:

a chassis dynamometer configured to perform a running test of a test object that is a test vehicle or a part of the test vehicle; and the automatic test object driving device according to claim 1.

10. An automatic test object driving method of automatically driving a test object that is a test vehicle or a part of the test vehicle based on a command vehicle speed, the method comprising:

using a first accelerator map and a second accelerator map each of which indicates a relationship among a vehicle-speed-related value, an acceleration-related value, and an accelerator-depression-amount-related value, the using including:

using the first accelerator map to determine an accelerator-depression-amount-related value corresponding to the command vehicle speed; and using the second accelerator map to correct the accelerator-depression-amount-related value by feeding back a vehicle-speed-related value or an acceleration-related value of the test object; and controlling the test object based on the corrected accelerator-depression-amount-related value.

\* \* \* \* \*